(12) United States Patent
Piechocki et al.

(10) Patent No.: US 8,879,664 B2
(45) Date of Patent: Nov. 4, 2014

(54) COMMUNICATION SYSTEM, METHOD AND APPARATUS

(75) Inventors: Robert Jan Piechocki, Bristol (GB); Dino Sejdinovic, Cambridge (GB)

(73) Assignee: The University of Bristol, Bristol (GB)

( * ) Notice: Subject to any disclaimer, the term of this patent is extended or adjusted under 35 U.S.C. 154(b) by 164 days.

(21) Appl. No.: 13/598,287

(22) Filed: Aug. 29, 2012

(65) Prior Publication Data
US 2013/0064272 A1    Mar. 14, 2013

(30) Foreign Application Priority Data

Aug. 31, 2011  (GB) .................................. 1115048.9
Jan. 5, 2012   (GB) .................................. 1200159.0

(51) Int. Cl.
| H04K 1/10 | (2006.01) |
| H04L 25/49 | (2006.01) |
| H04L 1/00 | (2006.01) |
| H04L 25/03 | (2006.01) |

(52) U.S. Cl.
CPC .............. *H04L 25/49* (2013.01); *H04L 1/0041* (2013.01); *H04L 25/03866* (2013.01); *H04L 25/4902* (2013.01)
USPC ....................................................... 375/296

(58) Field of Classification Search
USPC ........................... 375/260, 296, 316, 324, 340
See application file for complete search history.

(56) References Cited

U.S. PATENT DOCUMENTS

| 5,977,822 | A | 11/1999 | Rybicki et al. |
| 6,735,238 | B1 | 5/2004 | McCorkle |
| 2009/0051496 | A1* | 2/2009 | Pahlavan et al. ............. 340/10.2 |
| 2010/0124272 | A1* | 5/2010 | Fein et al. ................. 375/240.01 |
| 2013/0010892 | A1* | 1/2013 | Cronie et al. ................. 375/296 |

FOREIGN PATENT DOCUMENTS

| EP | 1 833 047 | 9/2007 |
| EP | 1 988 674 | 11/2008 |
| WO | 2007/079574 | 7/2007 |
| WO | WO2007/079574 | * 7/2007 |
| WO | 2009/026100 | 2/2009 |

OTHER PUBLICATIONS

Ewout Van den Berg et al., "Probing the Pareto Frontier for Basis Pursuit Solutions," SIAM J. Sci. Comput., vol. 31, No. 2, pp. 890-912 (2008).
United Kingdom Search Report dated May 4, 2012 in corresponding United Kingdom Patent Application No. GB1200159.0.

* cited by examiner

*Primary Examiner* — Jaison Joseph
(74) *Attorney, Agent, or Firm* — Pillsbury Winthrop Shaw Pittman LLP

(57) ABSTRACT

Encoding of a message is conducted using codewords selected from a codebook. The selected codewords are used to construct a corresponding plurality of waveforms, which are then weighted and added to form a signal for transmission. At a receiver, channel impulse response is used to determine which codewords from the known codebook have been used, and by which weights from a known constellation of weights the resultant waveforms have been weighted. A message embedded in a received signal can then be detected.

46 Claims, 6 Drawing Sheets

COMMUNICATION SYSTEM, METHOD AND APPARATUS

This application claims priority under 35 U.S.C. §119 to United Kingdom patent application no. 1115048.9, filed Aug. 31, 2011 and to United Kingdom patent application no. 1200159.0, filed Jan. 5, 2012, the entire content of each of the foregoing applications is incorporated herein by reference.

FIELD

The present disclosure concerns a communication system, apparatus and method to facilitate communication between multiple terminals. The approach disclosed is particularly but not exclusively directed to situations wherein communicating nodes operate in highly time dispersive environments.

BACKGROUND

Typical examples of highly time dispersive channels include wireless systems with large bandwidth, power line communication (e.g. for Smart Grids), underwater channels etc.

Additionally, an ad hoc network can present a scenario where a number of users attempt to exchange messages. Traditionally, time dispersion poses a difficult challenge for communication systems. The currently favoured solution is typified by OFDM and SC-FDE systems (e.g. 4G mobile systems, WiFi). The OFDM/FDE system requires a Cyclic Prefix (CP), which is at least as long as the largest delay expected in the channel. The CP is inserted in front of each OFDM symbol and does not carry any useful information, which represents a waste of bandwidth. Other existing solutions include equalisation in single carrier receivers (e.g. 2G mobile systems) and rake receivers for CDMA (e.g. 3G mobile systems). In all of those solutions, time dispersion represents a hindrance to a larger or smaller extent.

MAC Layer coordination is another source of inefficiency in communications systems. The MAC protocol regulates how competing users (services) access a shared resource (e.g. a radio channel). In a standard solution only a single user can occupy a shared resource; otherwise a "collision" occurs. The most important MAC protocols include CSMAICA (e.g. IEEE 802.11x) or (slotted) Aloha. The DS-CDMA system somewhat relaxes this constraint by allowing a group of synchronised users to transmit at the same time and in the same frequency (in the same cell). However, synchronisation is very difficult to achieve in an ad-hoc network.

DESCRIPTION OF SPECIFIC EMBODIMENTS

Figure 1:
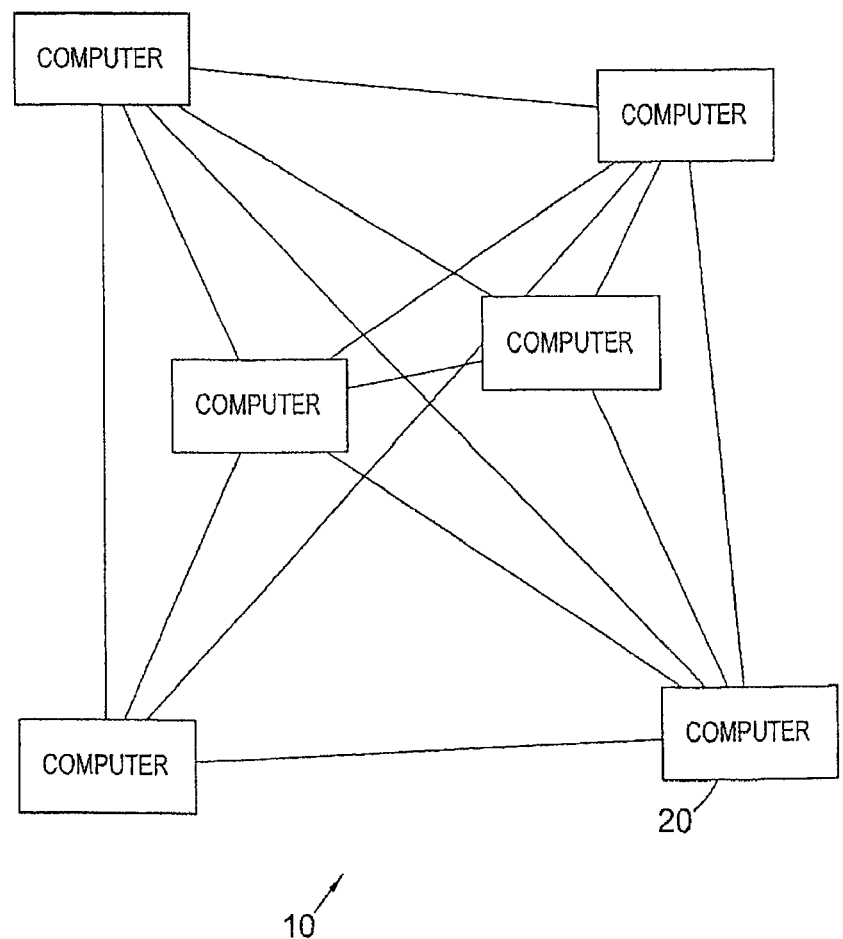
FIG. 1 is a schematic drawing of an ad hoc network in which an embodiment described herein is implemented.

Embodiments described herein operate on the basis of the dispersive nature of communications channels and harness this as an advantage. Such embodiments do not require equalisation, rake receivers, CP or any other guard intervals.

An embodiment described herein presents a method which does not require a complicated MAC layer coordination mechanism. The method, according to that embodiment, allows all users to transmit signals at the same time, therefore no coordination is needed. The third feature of the said method, which may be highly beneficial, is the ability to achieve a true duplex, i.e. all users in the network can transmit and receive signals at the same frequency and in the same time slot.

A method presented herein may also be applicable to optical communications. In optical communications (both guided and free space) one of the most efficient signalling schemes is called Multi-pulse position modulation (MPPM). A system implemented in accordance with the disclosure may allow even higher data rates, and simultaneously, the detection complexity may be significantly reduced.

A method presented herein uses a plurality of waveforms to encode a message to be transmitted, the plurality of waveforms being separately multiplied by weights (one weight for each waveform) and added together to produce an information bearing signal. The number of chosen waveforms may be much smaller than the number of all waveforms available, the information being encoded in accordance with the choice of waveforms.

The waveforms may be sparse, in the sense that they contain a small number of symbols separated by silent periods. For example, the number of symbols per available symbol positions may be in the range of 20-60%, depending on the application.

The weights may be chosen from a plurality of constellation points.

Channel impulse responses may be used to construct a corresponding plurality of waveforms in the receiver, the plurality of waveforms being constructed by convolving each waveform available for use in the transmitter with the channel impulse response.

A method of detection is disclosed wherein, at a receiver, waveforms are erased in time slots corresponding to the receiver's own transmissions.

Embodiments herein also disclose wireless and wired radio communication systems which provide a plurality of users/machines with full mutual communication (i.e. duplex communication), facilitated by the method of transmitting and method of receiving noted above.

The abovementioned method of receiving a message, can involve recovering the intended message by estimating which plurality of waveforms were chosen at the transmitter, and which weights where chosen at the transmitter.

Also provided in accordance with a described embodiment is a radio communication system (either wired or wireless) comprising a plurality of communicating users/machines, each of which have knowledge of a plurality of waveforms available for use by other users/machines in the system. In such an embodiment, a receiver user/machine would therefore know all possible waveforms, and channels from each user/machine.

A multi antenna radio communication apparatus can also be envisaged, in which where each antenna is assigned a plurality of waveforms and weights for use in transmission.

The information can be encoded by means of the choice of the waveforms for each antenna, and the choice of weights for each antenna. In one embodiment, the choice of waveforms for each antenna is not independent.

The wireless radio communication system can use a plurality of antennas for receiving signals.

Another embodiment comprises an optical communication system (either guided or free space), which uses a plurality of light pulse sequences, constructed to transmit or receive in accordance with methods set out above.

An ad hoc network 10 is illustrated in FIG. 1, which sets out a scenario in which the presently described embodiment can operate. The network 10 comprises a plurality of computers 20, each of which is connected to the other computers in the network 10. Connections may be by direct wireless means, or by other means such as power line communication, as will be described further hereafter.

Codebook Design and Signalling Modulation

The described system uses channel signatures (channel impulse response—CIR) to construct communication waveforms. Described herein, among other things, is a specific construction of the waveforms and the way information is encoded in the waveforms.

Figure 2:
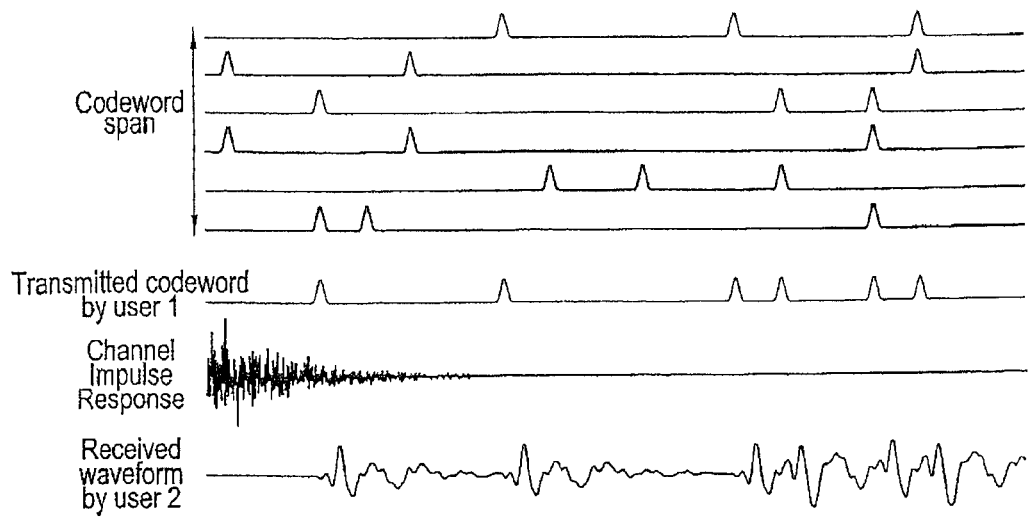
FIG. 2 is a graph depicting signalling waveforms encountered in a transmission from one computer to another in the ad hoc network illustrated in FIG. 1.

FIG. 2 depicts signalling waveforms for the described system. In this section, for clarity, the system is described using base-band signalling. However, the system is equally applicable to pass-band signalling (i.e. using complex representations). In fact, the mathematical description of the embodiment given in the section below applies pass-band signalling, which implies additional advantages (better spectral efficiency and frequency translation).

Each of the users constructs its transmitted signal using a codebook known to all intended receivers. In FIG. 2 there are L=6 entries in the codeword span. The message to be transmitted is encoded in an l-combination of the codeword span, i.e. in a choice of l out of L codewords in the codeword span, where l=L. It will be noted that there are $$\binom{L}{l} = \frac{L!}{l!(L-l)!}$$

such combinations.

For the reader's reference, the relative size of l with respect to L, beyond the simple statement that l=L, will be application specific, and can be viewed as a tuning parameter. For some applications, it may be sufficient that l is 20% of L, for others it may be that l should be as little as 1% of L.

L can be a very large number, such as in the order of tens of thousands. In that case, for the guidance of the reader, l could be of a different order of magnitude, since this is typically the sparsity level assumed in compressed sensing. Thus, by way of example, it may be judged appropriate for l=L to be represented, in a specific case, by l≈L/10. The intention, in selecting l, is to make l sufficiently small, with respect to L, that Compressed Sensing recovery methods are effective, but not so small that the information rate (proportional to $$\log_2\binom{L}{l})$$

would be impaired. The informed reader will appreciate that these specifications need not be articulated any more specifically here, and that numerous specific arrangements will be readily contemplated which meet these general specifications.

Specifically, the transmitted signal is a weighted sum of the chosen waveforms. In base-band, the weights are points in Amplitude Shift Keying (ASK) modulation e.g. {+1,−1}. In the provided example in FIG. 2, two waveforms are chosen: the first and third lines depicted, as from the top. Both weights happen to be +1. The transmitted waveform is the sum of the two (marked "Transmitted code word" in FIG. 2). Therefore, the information rate of this signalling scheme is $$R = \frac{1}{W}\left(\log_2\binom{L}{l} + lq\right) \text{ bits}/s,$$

where W is the time duration of the waveforms in seconds, and $2^q$ is the size of the alphabet of weights.

This particular construction of constituent waveforms (codeword span), combinatorial construction of the transmitted signal and the fact that l=L all play a crucial part since they allow very efficient decoding, MAC-less user coordination and full duplex operation for each user. A key feature of the constituent waveforms is sparsity. This means that in base-band the waveforms contain randomly located "UWB like" spikes. In the pass-band, the waveforms are constructed from very short bursts of digital modulation signals. The reader will appreciate that it is not the digital signal which carries useful information—the information rate is the same no matter what modulation (BPSK, QPSK, 16 QAM etc) is chosen to construct the waveforms. It is the choice of the i-combination of the codeword span and of the associated weights which carries the information.

The transmitted waveform is propagated in a dispersive channel (depicted as a green line) and received as a convolution of the two (black line). The implicit assumption here is that the channel can be modelled as a linear time invariant channel (FIR filter). Such an assumption is commonplace in the literature and in practice.

Figure 3:
FIG. 3 is a corresponding graph depicting received waveforms encountered in receiving a transmission from one computer to another in the ad hoc network illustrated in FIG. 1.

The presented system relies on the linearity property of convolution. The receiver reconstructs a modified codeword span—the waveforms marked "modified codeword span" in FIG. 3, where each waveform is the original codeword span convolved with the channel. The task for the receiver is to estimate which l waveforms were used by the transmitter. The whole detection process can be performed efficiently using sparse models and convex optimisation techniques, which are the backbone of compressive sensing—this is described in the next section. The transmitted waveform is essentially a sequence of on-off duty cycles, where for most of the time there are silent periods (off cycle). Each user utilises the "off cycles" to receive signals from the desired users. In the "on cycles" the user cannot receive the signal, which represents an erasure in the codebook. This is depicted in FIG. 3 as the dotted boxes. Only non-erased portions of the codebook are used in the detection process.

The presented system involves a non-linear encoding operation. The process of assigning a binary input message to a unique l-combination of the codeword span can be viewed as constant (hamming) weight coding CWC (equally important is the inverse map). CWC codes have been researched for a number of years, and many solutions are available in the literature.

Mathematical Description of the Method

In this example, a network of N+1 users denoted 0, 1, ..., N, is considered, in which each has a k+lq bit message to transmit to all others through a wireless medium. The number of transmissions is denoted M, and the message at user i is denoted by $\omega_i \in F_2^{k+lq}$. It is assumed that users are equipped with an encoder, which constitutes of bijective maps $\phi_C$ and $\phi_w$. The first map, $\phi_C: F_2^k \to C$ maps k-bit binary words into an (L,l) constant weight binary code $C \subseteq \{c \in F_2^L : w_H(c)=l\}$. The second map $\phi_w: F_2^{lq} \times C \to C^L$ assigns complex-numbered values to the non-zero entries in a constant weight binary codeword from C. For simplicity, it may be assumed that C consists of all possible $$\binom{L}{l}$$

constant weight codewords, in which case it can be assumed that $$k = \left\lfloor \log_2 \binom{L}{l} \right\rfloor.$$

In addition, it is assumed that each user uses the same constant weight binary code C, and the same maps $\phi_C$ and $\phi_w$, even though this assumption is not essential for the scheme. Each user i is assigned a signalling dictionary $S_i = (s_{i,1}, s_{i,2}, \ldots, s_{i,L})$, where each $s_{i,j} \in C^M$ is a sparse column vector. An example of the matrix $S_i$ (with BPSK construction) is:

$$S_i = \begin{bmatrix} 1 & 0 & 0 & 0 & 1 & 0 & 0 & 0 & -1 & -1 & 0 & 0 \\ 0 & -1 & 0 & 1 & 0 & 1 & -1 & 0 & 0 & 0 & 0 & 1 \\ 0 & 0 & 1 & 0 & 0 & 0 & 0 & -1 & 0 & 0 & -1 & 0 \\ 0 & 0 & 0 & 0 & 0 & 0 & 0 & 0 & 0 & 0 & 0 & 0 \\ 0 & 0 & 0 & 0 & 0 & 0 & 1 & 1 & 1 & 1 & 0 & 0 \\ -1 & 0 & 0 & 0 & 0 & 0 & 0 & 0 & 0 & 0 & 0 & 0 \\ 0 & 0 & 1 & -1 & 0 & 0 & 0 & 0 & 0 & 0 & 0 & 0 \\ 0 & 1 & 0 & 0 & -1 & 0 & 0 & 0 & 0 & 1 & 0 \\ 0 & 0 & 0 & 0 & 0 & 0 & 1 & 0 & 1 & 0 & 0 \\ 0 & 0 & 0 & 0 & 0 & 1 & 0 & 0 & 0 & 0 & -1 \\ 0 & 0 & 0 & 0 & 1 & 0 & 0 & 0 & 0 & 0 & 0 \\ 0 & 0 & -1 & 0 & 0 & 0 & 0 & -1 & 0 & 0 & 0 \\ 1 & 0 & 0 & 0 & 0 & 0 & 0 & 0 & 0 & 0 & 0 \\ 0 & -1 & 0 & 0 & 0 & -1 & 0 & 0 & 0 & 1 & 0 \\ 0 & 0 & 0 & 1 & 0 & 0 & 1 & 1 & 0 & 0 & 0 \\ 0 & 0 & 0 & 0 & -1 & 0 & 0 & 0 & 0 & -1 & 0 & 1 \end{bmatrix} \quad (1)$$

There is a connection between FIG. 2 and matrix $S_i$. Columns of the matrix $S_i$ are sampled waveforms constituting the codeword span. Each user has perfect knowledge of all N+1 signalling dictionaries, which in fact can be shared, subject to certain requirements on channel CIRs. Furthermore, each user i has a perfect knowledge of the channel impulse responses $h_{i,j} \in C^M$ of a channel between users j and i. Additionally, it can be readily assumed that each user has a perfect knowledge of its own channel $h_{i,i} \in C^M$, which is referred to as a "self-channel". The role of the self channel will be explained later.

The scheme proceeds as follows:

Transmission at Node i

1. User i encodes $b_i := \phi_C(\omega_{i,1:k})$ using a CWC code.
2. Further lq bits are encoded on non-zero entries in $b_i$, i.e., $$c_i := \phi_w(\omega_{i,k+1:k+lq}, b_i) = \phi_w(\omega_{i,k+1:k+lq}, \phi_C(\omega_{i,1:k}))$$

This is based on a bijective map that assigns a different complex number to each binary sequence of length q, which can be thought of as a QAM modulation with $2^q$ constellation points. In the case of pass-band signalling, where the non-zero entries in the signalling dictionary $S_i$ lie in $\{+1,-1\}$, weights can be chosen from the set $$\left\{ \frac{1+i}{\sqrt{2}}, \frac{-1+i}{\sqrt{2}}, \frac{-1-i}{\sqrt{2}}, \frac{1-i}{\sqrt{2}} \right\},$$

i.e. a QPSK symbol.

3. User i transmits $x_i = S_i c_i$, where the matrix-vector multiplication $S_i c_i$ is performed over C.

Recovery at Node i

1. An erasure pattern vector is defined as $e_i := \sim 1(x_i)$, where $1(v)=0$ if $v=0$ and $1(v)=1$ otherwise. An erasure matrix $E_i$ is produced from $1_{M,M}$ identity matrix, by removing rows where corresponding $e_i$ has zero entry. The number of rows in $E_i$ is denoted by M.
2. User i using off-duty cycles receives:

$$\bar{y}_i = E_i \left[ \sum_{j=0, j \neq i}^{n} h_{i,j} * S_j c_j + \tilde{z}_i \right] + E_i(h_{i,j} * S_i c_i) \quad (2)$$

where the "*" symbol denotes convolution truncated to M time slots, and $\tilde{z}_i$ represents the additive Gaussian noise over M time slots.

3. Subsequently, user i removes the self interference term $E_i(h_{i,j} * S_i c_i)$ to obtain:

$$y_i = \bar{y}_i - E_i(h_{i,j} * S_i c_i) = A_{-i} v_{-i} + z_i \quad (3)$$

where $z_i = E_i \tilde{z}_i$, $v_{-i}$ is the NL-column vector formed by concatenating vertically $c_0, c_1, \ldots, c_{i-1}, c_{i+1}, c_N$, i.e., $v_{-i} = [c_0^T | c_1^T | \ldots | c_{i-1}^T | c_{i+1}^T | \ldots | c_N^T]^T$ and $A_{-i}$ is an M×NL matrix, given by:

$$A_{-i} = E_i [h_{i,0} * S_0 | h_{i,1} * S_1 | \ldots | h_{i,j-1} * S_{i-1} | h_{i,j+1} * S_{i+1} | \ldots | h_{i,N} * S_N] \quad (4)$$

It should be noted that the matrix $A_{-i}$ can be calculated offline, as it depends only on the channel impulse responses and the signaling dictionaries, and needs to be updated only when the channel impulse response changes.

It will be appreciated by the reader that each user switches into reception mode immediately after transmitting encoded symbols. This means that, in the reception mode, if a user has just transmitted, there would at first in the reception mode be echoes of its own transmitted signal. Since all users know their own transmitted signal, the term $E_i(h_{i,j} * S_i c_i)$ can be subtracted in equation (3).

1. User i needs to solve the following problem to detect the desired signal:

$$\min_{\hat{v}_{-i}} \|y_i - A_{-i} \hat{v}_{-i}\|_2^2, \text{ such that } \|c_j\|_0 = l \quad (5)$$

for all $j = 0, 1, \ldots, i-1, i+1, \ldots, N$.

This is a non-convex optimisation problem. However, it is noted that exactly Nl out of NL entries in $\hat{v}_{-i}$ are non zero, so its sparsity level is by the initial assumption that $$\frac{l}{L} = 1.$$

This is a set-up found in compressive sensing (CS) problems, and thus any one of a range of efficient sparse recovery solvers available in the literature can be applied to find an approximate solution to equation (5). A simple example is to apply a convex relaxation method and replace the $L_0$ norm with the $L_1$ norm. Such an approach is referred to as LASSO (least absolute shrinkage and selection operator) in statistics or Basis Pursuit in signal processing. A number of other efficient methods have been proposed very recently in the literature to solve sparse recovery problems, and the next section gives a detailed overview of one such method, Subspace Pursuit. Methods in accordance with this embodiment can achieve polynomial complexity (specifically $O(N^2L^2)$ or $O(N^3L^3)$).

2. Finally, user i decodes the messages for all j≠i:

$(\omega_{j,k+1:k+lM},b_j) = \phi_w^{-1}(c_j),$ $\omega_{j,1:k} = \phi_C^{-1}(b_j).$ A further description of a detailed embodiment, and exploitation thereof, will now follow.

Figure 4:
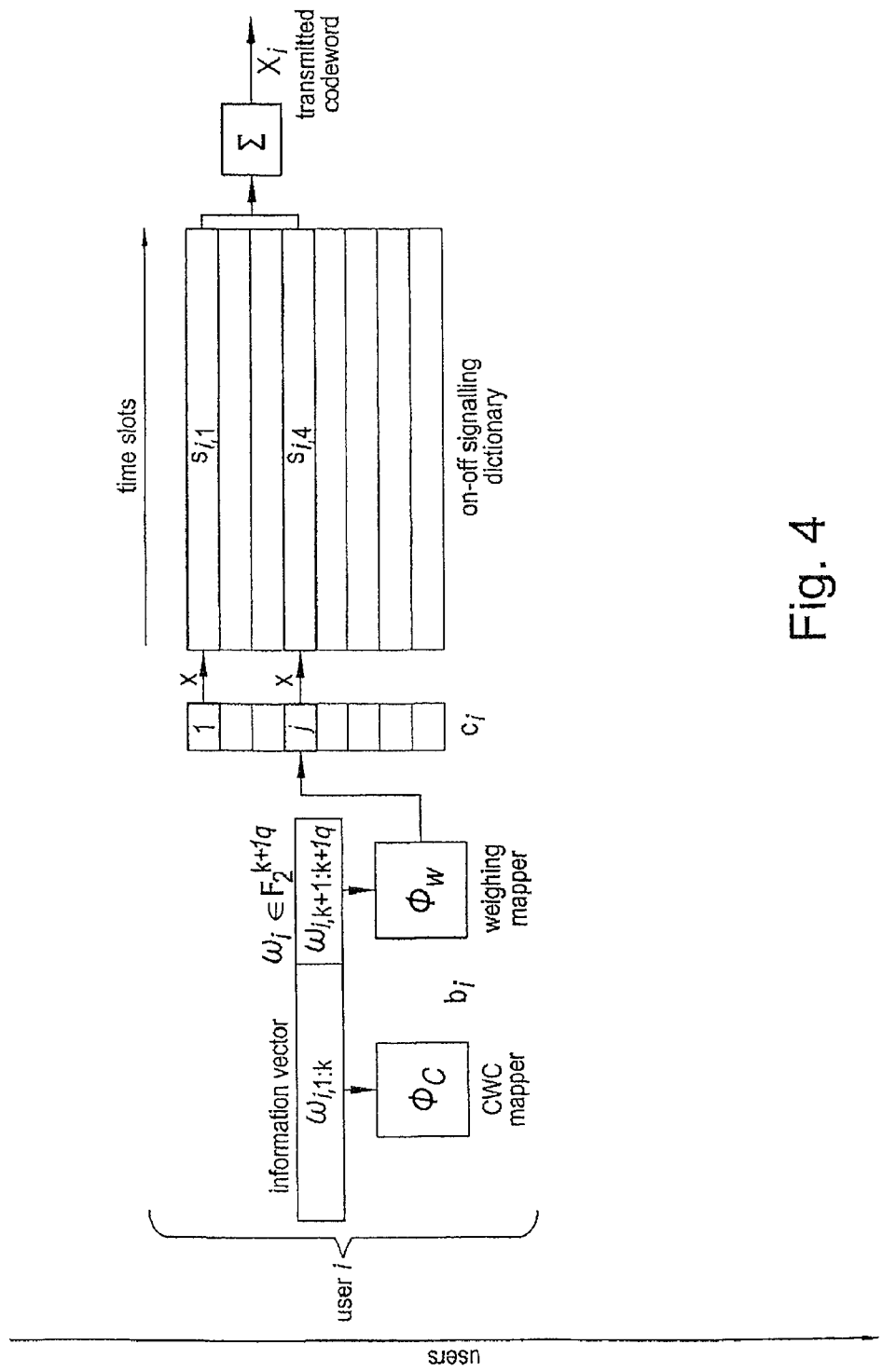
FIG. 4 is a schematic diagram of an encoder section of a computer of the ad hoc network illustrated in FIG. 1.

FIG. 4 depicts one embodiment of the transmitter for the disclosed apparatus. The term "transmitter" is used here, but equally the apparatus could be understood as a "user" (in the sense of user equipment) or a machine. In essence, each computer 20 in FIG. 1 embodies a transmitter. The binary information $\omega_i$ is split into two parts k and lq bits long. The first part is used to uniquely identify one out of $$\binom{L}{l}$$

possible combinations. As a specific example, one set of values could be L=64, l=12.

This is done via, for example, the CWC encoding process which will be known to the reader. The second part of the information, which is lq bits long, is used to encode l weights. This is done via, for example, digital modulation. Again, digital modulation will be known to the reader. Subsequently, the chosen entries (on-off waveforms) are multiplied by the weights and summed up to produce the transmitted waveform.

In another embodiment each user can have multiple transmitter chains, effectively performing all of the above operations in parallel. In such a case, each transmitted waveform would be transmitted from a separate antenna. In such an embodiment, the choice of one out of $$\binom{L}{l}$$

possible combinations could be coordinated between such parallel chains. In another embodiment the choice of one out of $$\binom{L}{l}$$

possible combinations for each chain would be independent.

Figure 5:
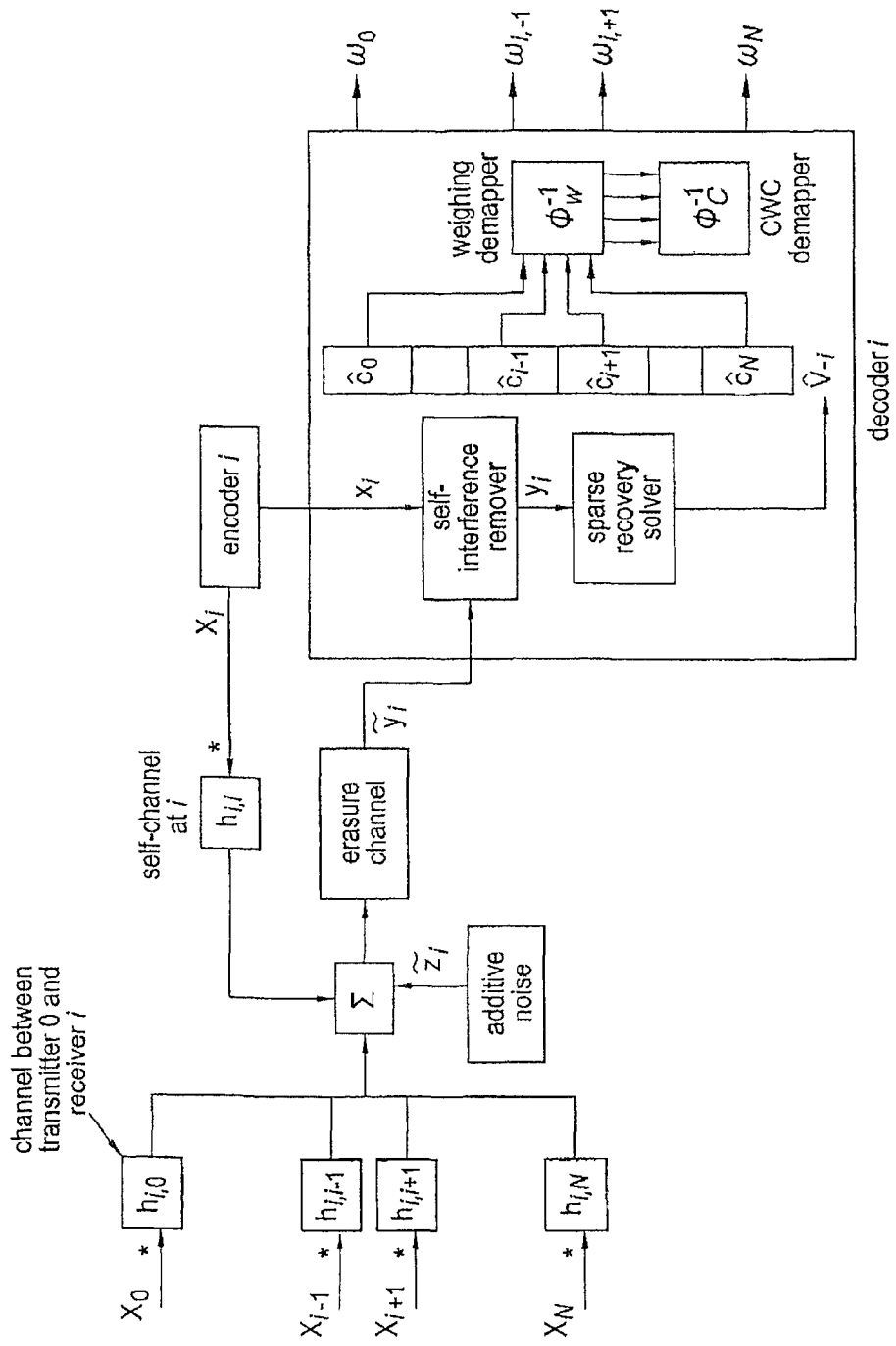
FIG. 5 is a schematic diagram of a receiver section of a computer of the ad hoc network illustrated in FIG. 1.

FIG. 5 depicts one embodiment of a corresponding receiver. The receiver (which could again be understood as a user, user equipment or a machine) receives a superposition of all signals from all intended transmitters. While separate transmitters and receivers are described, the reader will appreciate that a computer, such as those illustrated in FIG. 1, can incorporate the functionality of both transmitter and receiver. In addition, the received signal is superimposed with its own transmitted signal, referred to as self interference. The receiver does not receive the signal in on-cycles (when it transmits), which is represented by the erasure channel. The first stage is to remove the self interference components. The subsequent stage is the sparse recovery solver. In one embodiment this is achieved by a method termed Group Subspace Pursuit, which is further described below. In another embodiment there would be multiple receive antennas, the signal from all receive antennas would be fed to the same solver.

The signalling dictionary used in this example will now be further described.

The signalling dictionary $S_i$ at user i is another portion of the apparatus which can be judiciously optimized to suit the preferred choice of system parameters. In one embodiment, all columns of $S_i$ have equal number of non-zero entries, set to $$\left\lfloor \frac{M}{L} \right\rfloor,$$

and non-zero entries are selected uniformly at random from a predescribed constellation, for example from set $\{+1, -1\}$. Moreover, every two columns in $S_i$ have disjoint support. This way, as the transmitted codeword $x_i$ is formed as a weighted sum of exactly l columns in $S_i$, the transmitted codeword will have exactly $$l \cdot \left\lfloor \frac{M}{L} \right\rfloor$$

non-zero entries, implying that every user i will have exactly $$l \cdot \left\lfloor \frac{M}{L} \right\rfloor$$

on-slots and will use its $$M - l \cdot \left\lfloor \frac{M}{L} \right\rfloor$$

off-slots to listen to the incoming signals of other users. Another way to construct a signalling dictionary is to apply a regular Gallager construction, which was originally developed for LDPC codes.

The sparse recovery solver mentioned above will now be exemplified.

It will be recalled that the sparse recovery problem that each user i solves in order to correctly detect the transmitted messages is given by:

$$\hat{v}_{-i} = \underset{v_{-i}}{\operatorname{argmin}} \|y_i - A_{-i} v_{-i}\|_2^2 \quad (6)$$

such that $\|c_j\|_0 = 1$ for all $j=0, 1, \ldots, i-1, i+1, \ldots, N$
where $v_{-i} = [c_0^T | c_1^T | \ldots | c_{i-1}^T | c_{i+1}^T | \ldots | c_N^T]^T$. This is a non-convex and intractable optimization problem. However, in the spirit of the compressed sensing framework, one can apply a convex relaxation, by replacing the $L_0$ norm with the $L_1$ norm:

$$\hat{v}_{-i} = \underset{v_{-i}}{\operatorname{argmin}} \|y_i - A_{-i} v_{-i}\|_2^2 \quad (7)$$

such that $\|c_j\|_1 = 1$ for all $j=0, 1, \ldots, i-1, i+1, \ldots, N$

A simplified form of the convex relaxation uses a standard embodiment of the LASSO/Basis Pursuit solver. For example, the SPGL1 solver of Ewout van den Berg, "Probing the Pareto Frontier for Basis Pursuit Solutions" (SIAM J. Sci. Comput. 31, 890 (2008); doi:10.1137/080714488) renders:

$$\hat{v}_{-i} = \underset{v_{-i}}{\operatorname{argmin}} \|y_i - A_{-i} v_{-i}\|_2^2 \quad (8)$$

such that $\|v_{-i}\|_1 \leq lN$.

Another method to solve the original problem given in equation (6), is to employ a greedy iterative sparse recovery algorithm. A number of such algorithms have appeared in the literature including Compressive Sampling Matching Pursuit (CoSaMP) and Subspace Pursuit (SP). These algorithms can be enhanced to take into account the additional structure of the unknown vector that is imposed by the present system set-up. These enhancements are described in the example of Subspace Pursuit, introducing the Group Subspace Pursuit algorithm below. A corresponding modification of the CoSaMP algorithm can be derived similarly.

Standard Subspace Pursuit

SP aims to first find the support set $T_i$, of $v_{-i}$ with cardinality $lN$. The values of the non-zero entries can then be easily recovered using the Moore-Penrose pseudoinverse of matrix $A_{-i,T_i}$ formed of $lN$ columns of $A_{-i}$ corresponding to the support set $T_i$:

$$v_{-i,T_i} = (A^*_{-i,T_i} A_{-i,T_i})^{-1} A^*_{-i,T_i} y_i. \quad (9)$$

The support set is chosen such that $y_i$ is close to the span of the columns of $A_{-i,T_i}$ using the following iterative procedure:
1. Initialise $T_i$ to the $lN$ indices largest in magnitude in $A^*_{-i} y_i$
2. Iterate until convergence:
   a. $y_{res} \leftarrow A_{-i}(A^*_{-i,T_i} A_{-i,T_i})^{-1} A^*_{-i,T_i} y_i$
   b. Set $\overline{T}_i$ to the $lN$ indices largest in magnitude in $A^*_{-i} y_{res}$
   c. Set $T_i$ to the $lN$ indices from $T_i \cup \overline{T}_i$ largest in magnitude in $(A^*_{-i,T_i \cup \overline{T}_i} A_{-i,T_i \cup \overline{T}_i})^{-1} A^*_{-i,T_i \cup \overline{T}_i} y_i$ 3. $\hat{v}_{-i,T_i} \leftarrow A_{-i}(A^*_{-i,T_i} A_{-i,T_i})^{-1} A^*_{-i,T_i} y_i$.

Group Subspace Pursuit (SP)

Group SP aims to find the support set $U_j$ of sub-vector $c_j$ with cardinality $l_i$ for each $j=0, 1, \ldots i-1, i+1, \ldots N$.
1. For each j, initialise $U_i$ to the l indices largest in magnitude in the j-th L-sub-vector of $A^*_{-i} y_i$ and $T_i \leftarrow U_j U_j$.
2. Iterate until convergence:
   a. $y_{res} \leftarrow A_{-i}(A^*_{-i,T_i} A_{-i,T_i})^{-1} A^*_{-i,T_i} y_i$
   b. For each j, set $\overline{U}_j$ to the l indices largest in magnitude in the j-th L-sub-vector of $A^*_{-i} y_{res}$
   c. $\overline{T}_i \leftarrow U_j \overline{U}_j$
   d. For each j, set $U_j$ to the l indices from $U_j \cup \overline{U}_j$ largest in magnitude in the j-th 2l-sub-vector of $(A^*_{-i,T_i \cup \overline{T}_i} A_{-i,T_i \cup \overline{T}_i})^{-1} A^*_{-i,T_i \cup \overline{T}_i} y_i$ and $T_i \leftarrow U_j U_j$.
3. $\hat{v}_{-i,T_i} \leftarrow A_{-i}(A^*_{-i,T_i} A_{-i,T_i})^{-1} A^*_{-i,T_i} y_i$.

Implementation Opportunities

The main area in which implementations of the described embodiment may exhibit advantage is wireless ad-hoc networks, where multiple users attempt to communicate messages amongst themselves.

Another area is vehicular communication networks. In vehicular networks, road safety can be enhanced via a constant broadcast of positioning data (exact position, speed, acceleration, braking indication) to all neighbouring vehicles. A currently suggested solution based on the IEEE 802.11 protocol is very inefficient for this purpose. Embodiments implemented in accordance with the method disclosed herein may be well suited for such an application.

Another area for possible exploitation is optical communication networks. One modulation scheme for such networks is called Multiple Pulse Position Modulation (MPPM). Embodiments in accordance with the disclosed arrangements may be provided which substantially outperform MPPM.

It is contemplated that a particular implementation of embodiments described herein may comprise visible light communication, which may be conducted with, or without, the use of waveguides. This could have particular use in local area networks, machine-to-machine communication, or intra-chip communication.

The reader will appreciate that, while the above embodiments are described in the context of communication between computing devices such as laptop computers, hand-held computers or desktop computers, communication between larger or smaller scale devices, including chips, or sub-systems within a single package, are also the subject of consideration. This draws in examples such as system-in-package and system-on-a-chip designs. Nanocommunication, specifically optical communication, are applicable to such implementations.

Another area of application is wireless sensor networks.

The method disclosed in this document may also be applicable to wired communication. One possible opportunity for implementation of the method is in power line communications (e.g. in conjunction with smart grids).

Numerical Results

In this section numerical results are reported from experimental implementations of embodiments in accordance with the above disclosure. Comparisons are made with prior art approaches. The number of users is denoted as K, hence K=N+1.

Figure 6:
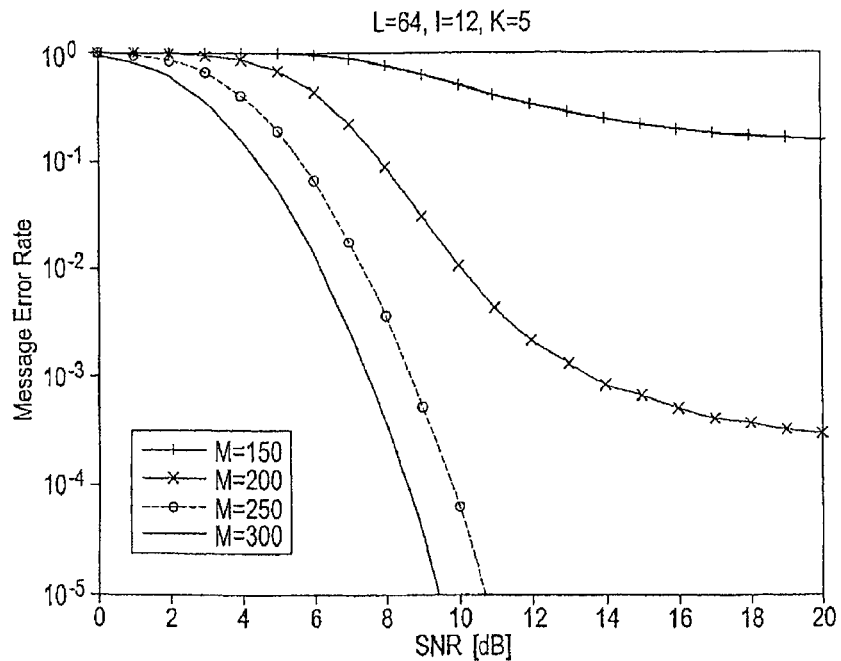
FIG. 6 is a graph of performance of a method described herein in terms of message error rate.

In a first case, a multi-user wireless network is considered with K=5 nodes, all within their communication range. All users attempt to broadcast a (common) message to all other nodes. FIG. 6 depicts the performance of an embodiment as described herein, in terms of message error rate (MER) for this scenario. The MER is an empirical probability estimate of an event of a failure occurring in the message delivery. A very dispersive channel is assumed, modelled by an FIR filter with 32 taps. Moreover, each pair of nodes is assumed to have an independent channel. The MER is investigated as a function of the level of ubiquitous noise (additive white Gaussian). There is no additional outer coding in the system, therefore MER=$10^{-2}$ is assumed as a suitable performance threshold.

Disclosed System Throughput

From FIG. 6, it can be seen that, to achieve this benchmark, the present example involves an overall transmission/reception interval corresponding to M=175 symbol intervals (transmissions) (at 10 dB SNR). In this time interval, the present example carries 65.5 bits from each user to all other users (and receives the same amount of information from each user). This follows from $$\log_2 \binom{64}{12} + 24 = 65.5,$$

since passband signalling is assumed, with weights taken from the QPSK alphabet.

Hypothetical (Best) Benchmarking System

For the sake of comparison, the throughput is estimated of a model of what can be considered the best hypothetical solution, constructed using the existing techniques in an idealised scenario. In such a hypothetical system a central controlling mechanism would closely coordinate transmissions between all users. To avoid interference, the total transmission time would be divided equally into K non overlapping slots. Each user would broadcast its message to all other users in its designated slot, and receive messages from all other users in the remaining K−1 slots. The throughput is thus estimated for the same 175 symbol intervals. To achieve the same performance threshold in similar SNR, such a system would be restricted to using BPSK or at best QPSK signalling. Furthermore, to cope with the dispersive channel nature, such a system would need to use FDE/OFDM. A typical FDE/OFDM system requires a guard interval (cyclic prefix) of about 20% slot duration. With these assumptions, such a system has a throughput of 28 bits for BPSK, or 56 bits for QPSK signalling. This follows from 175/5×80%=28 time slots per user. However, in reality, additional guard intervals would be needed, and close coordination between nodes also implies additional overheads. When compared even to this idealised system, the presented example of the described embodiment offers better throughput.

Practical Benchmarking System

Figure 7:
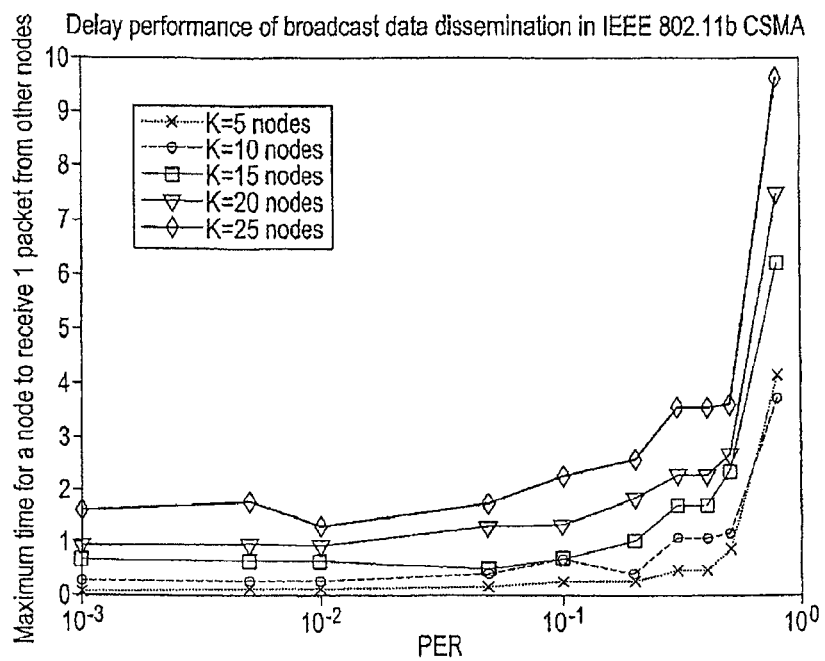
FIG. 7 is a graph of performance of a practical CSMA system.

The second benchmarking system to be considered is a system based on a currently used distributed coordination function (DCF), more specifically DCF as used in IEEE 802.11b MAC in broadcasting mode. To make this system as efficient as possible only basic CSMA (without RTS/CTS) is deployed as there is no hidden node problem in the presently considered scenario. FIG. 7 depicts the performance of such a system. In this scenario there is no central coordination mechanism and all nodes deploy DCF to avoid interference. The task is the same as before, namely to broadcast one packet of data to all other users. The system uses the most resilient mode to broadcast a packet which lasts for 12.5 ms. FIG. 7 shows the total average delay to complete the communications. Assuming minimum overheads and very good channel quality, it can be taken that PER=$10^{-3}$ as a benchmark ($10^{-2}$ is about the same). Table 1 lists throughput gains η when the present example is compared to a practical system in accordance with known techniques.

TABLE 1

| | K = 10 | K = 15 | K = 20 | K = 25 |
|---|---|---|---|---|
| η | 2 | 3 | 4 | 5 |

The table reveals that the present exemplary system offers twice the throughput when K=10, and much larger gains for higher number of users.

Regular Gallager Construction

By way of background to the above disclosure, the signalling dictionary $S_i$ can be constructed using techniques know in LDPC coding literature. One such technique is presented below.

A matrix, denoted by H0=[I, I, . . . I], is constructed by concatenating identity matrices of appropriate sizes (dictated by L, l and an erasure ratio). The basic signalling matrix is constructed as:

$$H = \begin{bmatrix} \pi_1(H0) \\ \pi_2(H0) \\ M \\ \pi_\xi(H0) \end{bmatrix}$$

where $\pi_j(H0)$ denotes a matrix whose columns are a permuted version of columns in H0. The signalling dictionary $S_i$ is constructed from H, by randomising the sign of non zero entries.

Additional Results

In this section, additional numerical results are presented for the aid of the reader in understanding examples of the embodiments described herein.

Performance of Group Subspace Pursuit

Figure 8:
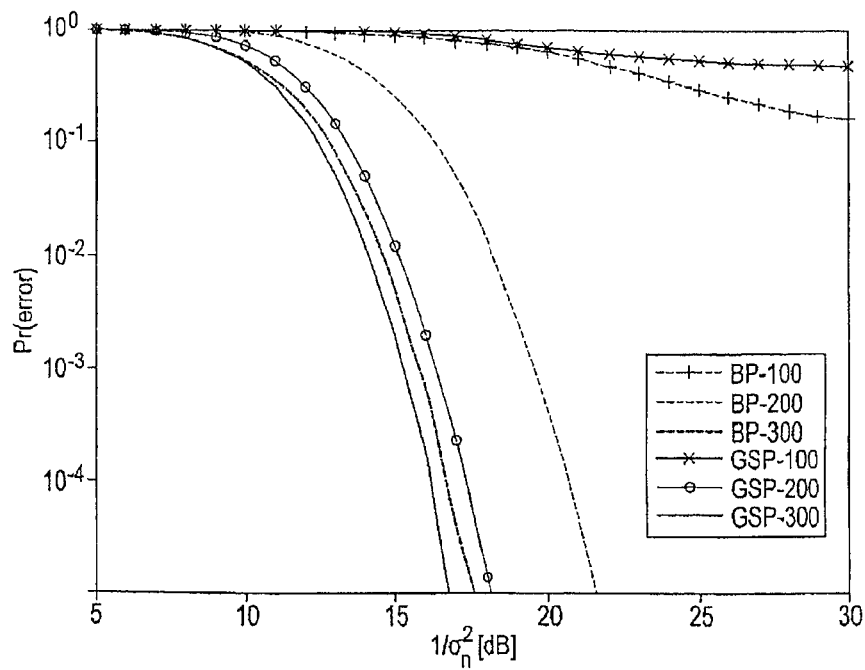
FIG. 8 is a graph depicting comparison of performance of group subspace pursuit and basis pursuit.

As a part of this disclosure, a novel decoding technique is presented, which is termed "Group Subspace Pursuit" (GSP). GSP is a low complexity method, which has computational complexity of Least Square estimator of size l(K−1). This is much lower complexity than convex optimisation techniques. FIG. 8 depicts the performance of GSP, contrasted against the performance of Basis Pursuit (convex optimisation). BP is not easily amendable to take into account the group structure of the problem presented here. Therefore, in this study BP is presented "as is". It can be observed that GSP offers much improved performance when compared to BP.

Additional Results for Different Parameter Settings

Figure 9:
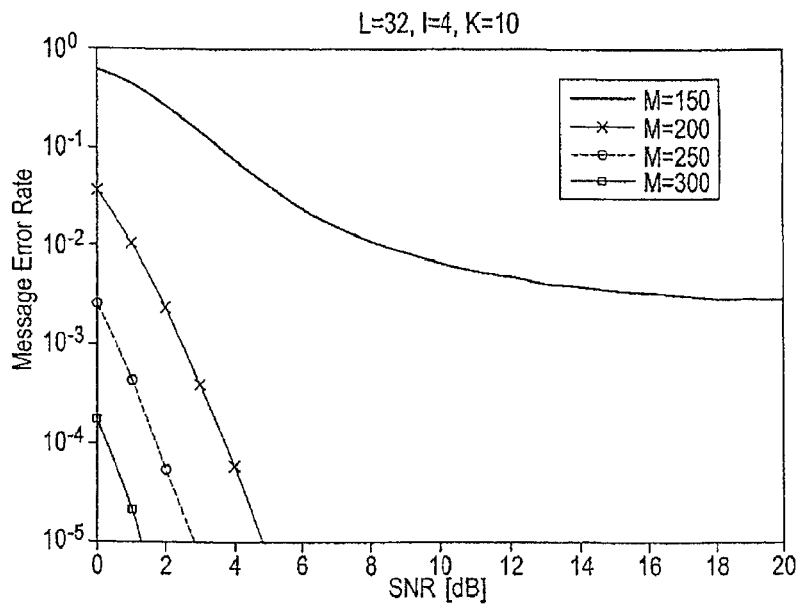
FIG. 9 is a graph depicting performance of the method described herein in terms of message error rate.

FIG. 9 depicts the performance of the CSM method with a GSP decoder for the case L=32, l=4 and K=10 nodes.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A method of embedding a message in a signal prior to transmission, the method comprising:
    selecting a plurality of codewords from a codebook of codewords known to receivers,
    encoding the message using the selected plurality of codewords to obtain a plurality of waveforms,
    multiplying each waveform by a respective weight, and
    adding the multiplied waveforms to produce an information bearing signal.

2. The method in accordance with claim 1, wherein the plurality of codewords selected for use is smaller than the number of codewords contained in the codebook.

3. The method in accordance with claim 2, wherein the plurality of codewords selected for use is less than 20% of the number of codewords contained in the codebook.

4. The method in accordance with claim 1, wherein the codebook is sparse, such that each codeword results in an encoded waveform comprising a small number of symbols separated by silent periods.

5. The method in accordance with claim 4, wherein the sparsity of the codebook is such that fewer than 60% of the codebook entries comprise symbols.

6. The method in accordance with claim 4, wherein the sparsity of the codebook is such that at least 20% of the codebook entries comprise symbols.

7. The method in accordance with claim 1, further comprising selecting weights from a constellation of weights.

8. The method in accordance with claim 1, wherein each codeword comprises a plurality of symbols, and wherein each codeword comprises the same number of symbols.

9. A method of configuring a receiver for receiving an encoded signal transmitted on a channel, the receiver having knowledge of a codebook, the codebook comprising a plurality of available codewords by which the encoded signal may be encoded, the method comprising:
receiving a channel impulse response, and
constructing a plurality of waveforms in the receiver corresponding to encoding of the channel impulse response by each of the codewords of the codebook.

10. A method of detecting a message in a received encoded signal comprising configuring the receiver in accordance with claim 9 and using the convolution result to detect the message.

11. The method of detecting in accordance with claim 10, further comprising erasing the received encoded signal in time slots corresponding to transmissions by the receiver.

12. The method of detecting in accordance with claim 10, further comprising identifying a message in the encoded signal by estimating which plurality of codewords were used in encoding the message on the signal, and which weights were applied to waveforms resulting from encoding the message with the codewords.

13. The method in accordance with claim 12, wherein the estimating is conducted using a sparse recovery optimisation.

14. The method in accordance with claim 13, wherein the sparse recovery optimisation is conducted using a convex relaxation.

15. The method in accordance with claim 13, wherein the sparse recovery optimisation is conducted using a greedy iterative sparse recovery algorithm.

16. The method in accordance with claim 15, wherein the greedy iterative sparse recovery algorithm comprises a subspace pursuit algorithm.

17. The method in accordance with claim 16, wherein the greedy iterative sparse recovery algorithm comprises a group subspace pursuit algorithm.

18. The method in accordance with claim 9, wherein each codeword comprises a plurality of symbols, and wherein each codeword comprises the same number of symbols.

19. A communications device operable to emit a signal in which a message has been embedded, the device comprising signal processing means operable to embed a message on a signal, codebook storage means storing a codebook comprising a plurality of codewords, codeword selecting means for selecting a subset plurality of codewords from the codebook, message encoding means for encoding the message using the selected plurality of codewords to obtain a plurality of waveforms, waveform weighting means for multiplying each waveform by a respective weight and waveform adding means for adding the multiplied waveforms to produce an information bearing signal.

20. The device in accordance with claim 19, wherein the codeword selecting means is operable such that the plurality of codewords selected for use is very much smaller than the number of codewords contained in the codebook.

21. The device in accordance with claim 19, wherein the codebook is sparse, such that each codeword results in an encoded waveform comprising a small number of symbols separated by silent periods.

22. The device in accordance with claim 19, further comprising weight constellation storage means storing a constellation of weights, the waveform weighting means being operable to use weights stored in said weight constellation storage means.

23. A receiver for receiving an encoded signal transmitted on a channel, the receiver comprising:
codebook storage means storing a codebook comprising a plurality of available codewords by which an encoded signal may be encoded, and
channel impulse response processing means operable to receive a channel impulse response encoded in a manner to be determined, the channel impulse response processing means being operable to construct a plurality of waveforms corresponding to encoding of the channel impulse response by each of the codewords of the codebook.

24. The receiver in accordance with claim 23, further comprising message detecting means operable to use the constructed plurality of waveforms to detect the message.

25. The receiver in accordance with claim 24, configured to also transmit signals from time to time and comprising signal erasing means operable to erase a received encoded signal in time slots corresponding to transmissions by the receiver.

26. The receiver in accordance with claim 24, wherein the message detecting means is operable to estimate which plurality of codewords were used in encoding the message on the signal, and which weights were applied to waveforms resulting from encoding the message with the codewords.

27. The receiver in accordance with claim 26, wherein the message detecting means is operable to use a sparse recovery optimisation.

28. The receiver in accordance with claim 27, wherein the sparse recovery optimisation comprises a convex relaxation.

29. The receiver in accordance with claim 27, wherein the sparse recovery optimisation comprises a greedy iterative sparse recovery algorithm.

30. The receiver in accordance with claim 29, wherein the greedy iterative sparse recovery algorithm comprises a subspace pursuit algorithm.

31. The receiver in accordance with claim 29, wherein the greedy iterative sparse recovery algorithm comprises a group subspace pursuit algorithm.

32. The receiver in accordance with claim 23, wherein each codeword comprises a plurality of symbols, and wherein each codeword comprises the same number of symbols.

33. A communications device comprising:
a message encoder for encoding a message onto a signal for emission,
a receiver for receiving a signal and for detecting a message embedded on a received signal, and
codebook storage means storing a codebook comprising a plurality of codewords,
the message encoder further comprising signal processing means operable to embed a message on a signal, codeword selecting means for selecting a subset plurality of codewords from the codebook, message encoding means for encoding the message using the selected plurality of codewords to obtain a plurality of waveforms, waveform weighting means for multiplying each waveform by a respective weight and waveform adding means for adding the multiplied waveforms to produce an information bearing signal, and wherein the receiver comprises channel impulse response processing means operable to receive a channel impulse response encoded in a manner to be determined, the channel impulse response processing means being operable to construct a plurality of waveforms corresponding to encoding of the channel impulse response by each of the codewords of the codebook.

34. A system comprising a plurality of devices, each device being in accordance with claim 33, each device being in communication with at least one other device in the system.

35. The system in accordance with claim 34 wherein each device is in duplex communication with at least one other device in the system.

36. The system in accordance with claim 34, wherein at least one of the devices is in wireless communication with at least one other device in the system.

37. The system in accordance with claim 36, wherein said wireless communication comprises radio communication.

38. The system in accordance with claim 34, wherein at least one of the devices is in wired communication with at least one other device in the system.

39. The system in accordance with claim 38, wherein said wired communication comprises power line communication.

40. The system in accordance with claim 34, wherein at least one of the devices is in optical communication with at least one other device in the system.

41. The system in accordance with claim 40, comprising an optical waveguide for conducting optical communication.

42. The system in accordance with claim 40, comprising a local area network.

43. The system in accordance with claim 40, wherein the system comprises system in package, an encapsulation being provided around the devices of the system, said optical communication being implemented within said encapsulation.

44. The system in accordance with claim 43, wherein the system in package comprises a single substrate, the devices being implemented on the substrate, thereby constituting a system on a chip.

45. The communications device in accordance with claim 33, comprising a plurality of antennas for transmission of a signal, wherein each antenna is assigned a plurality of codewords and weights for use in encoding a message.

46. The communications device in accordance with claim 45, comprising a plurality of antennas for reception of a signal.

* * * * *